United States Patent
Hwang et al.

(10) Patent No.: US 6,711,325 B2
(45) Date of Patent: Mar. 23, 2004

(54) ZIGZAG WAVELENGTH DIVISION MULTIPLEXER

(75) Inventors: Yu-Wen Hwang, Shinchu (TW); Forest Lin, Hsinchu (TW); Lucent Yang, Hsinchu (TW)

(73) Assignee: Browave Corporation, Hsin-Chu (TW)

( * ) Notice: Subject to any disclaimer, the term of this patent is extended or adjusted under 35 U.S.C. 154(b) by 0 days.

(21) Appl. No.: 10/298,438

(22) Filed: Nov. 18, 2002

(65) Prior Publication Data

US 2003/0138194 A1 Jul. 24, 2003

(30) Foreign Application Priority Data

Jan. 24, 2002 (TW) ........................................ 91101181 A

(51) Int. Cl.[7] ................................................. G02B 6/28
(52) U.S. Cl. ........................................ 385/24; 385/34
(58) Field of Search ................................ 385/24, 31–35

(56) References Cited

U.S. PATENT DOCUMENTS

| | | | | |
|---|---|---|---|---|
| 4,244,045 A | * | 1/1981 | Nosu et al. ................ | 398/86 |
| 5,905,827 A | * | 5/1999 | Naganuma et al. ........ | 385/31 |
| 6,118,912 A | * | 9/2000 | Xu ............................. | 385/24 |
| 6,198,857 B1 | * | 3/2001 | Grasis et al. .............. | 385/24 |
| 6,301,407 B1 | * | 10/2001 | Donaldson ................ | 385/34 |
| 6,515,776 B1 | * | 2/2003 | Naganuma ................ | 398/82 |

* cited by examiner

Primary Examiner—Ellen E. Kim
(74) Attorney, Agent, or Firm—Thomas, Kayden, Horstemeyer & Risley

(57) ABSTRACT

A zigzag wavelength division multiplexer. The zigzag wavelength division multiplexer reduces the wavelength shift in the center of a frequency band caused by temperature changes. The zigzag wavelength division multiplexer includes an intermediate block, an input end and a plurality of output ends. The input end has a first sleeve and an optical collimator disposed in the first sleeve. Each of the output ends has a second sleeve, a wave filter and an optical collimator. The optical collimator and the wave filter are disposed in the second sleeve. The zigzag wavelength division multiplexer reduces use of the GRIN lens and glass ferrule, and thereby manufacturing costs.

12 Claims, 5 Drawing Sheets

ZIGZAG WAVELENGTH DIVISION MULTIPLEXER

BACKGROUND OF THE INVENTION

1. Field of the Invention

The present invention relates to a zigzag wavelength division multiplexer, and in particular to a zigzag wavelength division multiplexer reducing the wavelength shift in the center of a frequency band resulting from temperature changes.

2. Description of the Related Art

FIG. 1A is a schematic perspective view showing a conventional zigzag wavelength division multiplexer. The conventional zigzag wavelength division multiplexer (U.S. Pat. No. 5,859,717) includes a housing 1. A support 2, a first collimator 3, a second collimator 4, a third collimator 5, a fourth collimator 6, a fifth collimator 7 and a sixth collimator 8 are disposed in the housing 1. A first wave filter 9, a second wave filter 10, a third wave filter 11 and a fourth wave filter 12 are disposed in the support 2. The first collimator 3 outputs multi-channel collimated light to the first wave filter 9 at an incident angle. Generally speaking, the incident angle is between 5° and 9°. Preferably, the incident angle is 7°. Specifically, the wavelength of light passing through the wave filter is changed whenever the incident angle is changed by 0.15°. Furthermore, the higher the incident angle, the higher the polarization dependent loss (PDL).

In the conventional zigzag wavelength division multiplexer (U.S. Pat. No. 5,859,717), spacers 13 are used to fix the collimators, as shown in FIG. 1B. The spacers 13 can only prevent length change of the collimator resulting from thermal expansion and contraction, but not tilt angle between the collimator and the wave filter. Thus, the adhesive 14 causes tilt angle between the collimator and the wave filter resulting from thermal expansion and contraction, and the tilt angle causes wavelength shift in a frequency band and subsequent light loss.

SUMMARY OF THE INVENTION

An object of the invention is to provide a zigzag wavelength division multiplexer. The zigzag wavelength division multiplexer comprises an intermediate block, an input end and a plurality of output ends. The input end is disposed on one side of the intermediate block and has a first sleeve and an optical collimator. The first sleeve has a first fixing portion having a hole. The axis of the first sleeve is tilted to the plane of the opening of the first sleeve at a first angle. The optical collimator is disposed in the first sleeve and fixed to the first fixing portion. The output ends are disposed on two sides of the intermediate block. Each of the output ends has a second sleeve, a GRIN lens, a first pad, a glass ferrule, a second pad and a wave filter. The second sleeve has a first portion, a second portion and a second fixing portion having a hole. The axis of the first portion is coaxial to that of the second portion. The axis of the second portion is tilted to the plane of the opening of the second portion at a second angle. The GRIN lens is disposed in the first portion and fixed to the second fixing portion. The first pad is disposed on one end of the GRIN lens. The glass ferrule is disposed on the first pad. The second pad is disposed on the opening of the second portion of the second sleeve and the side of the intermediate block. The wave filter is disposed in the second portion and on the second pad. After multi-channel light enters the intermediate block via the input end, the output ends output corresponding channel light, respectively.

The invention has the following advantages. The invention uses sleeves to fix the optical collimators and the wave filters, thus preventing a tilt angle between the optical collimator and the wave filter. In addition, the invention reduces the wavelength shift in the center of a frequency band resulting from temperature changes. Furthermore, the invention uses the sleeves to fix the optical collimators and the wave filters, thus reducing light loss.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
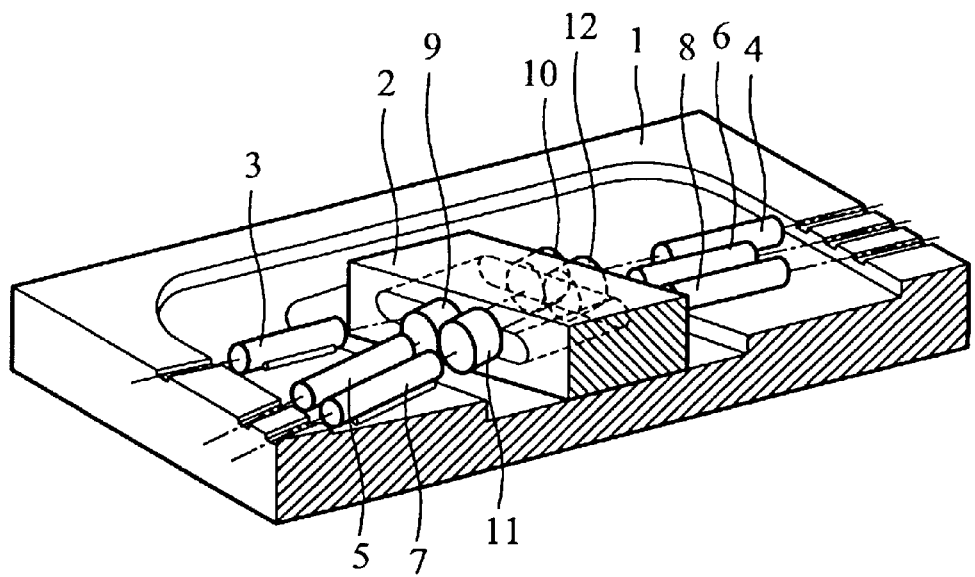
FIG. 1A is a schematic perspective view showing a conventional zigzag wavelength division multiplexer.
Figure 1B:
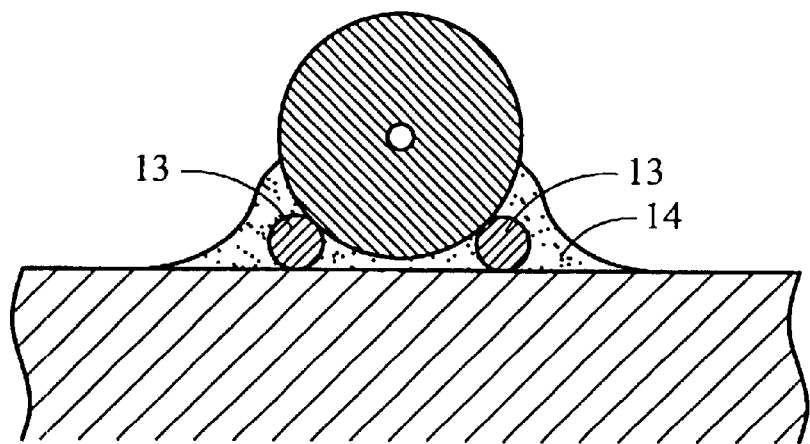
FIG. 1B is a schematic view showing the conventional zigzag wavelength division multiplexer using spacers to fix the collimator.
Figure 2:
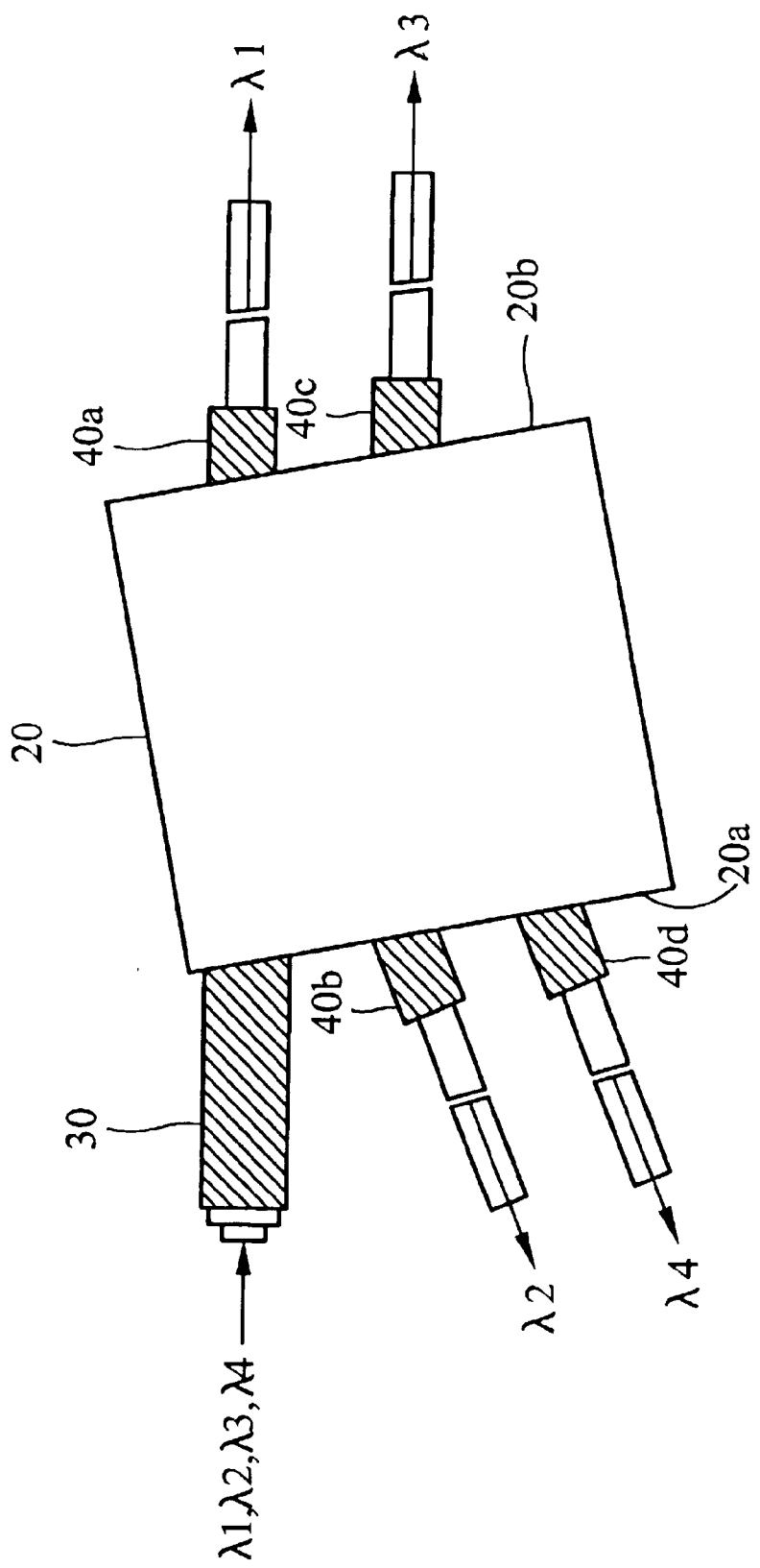
FIG. 2 is a schematic top view showing the zigzag wavelength division multiplexer of the invention.

Referring to FIG. 2, the zigzag wavelength division multiplexer includes an intermediate block 20, an input end 30 and a plurality of output ends 40a, 40b, 40c and 40d. The input end 30 and the plurality of output ends 40a, 40b, 40c and 40d are disposed on two sides 20a and 20b of the intermediate block 20. After multi-channel light enters the intermediate block 20 via the input end 30, the first output end 40a outputs a first channel beam λ1, the second output end 40b outputs a second channel beam λ2, the third output end 40c outputs a third channel beam λ3, and the fourth output end 40d outputs a residual channel beam λ4.

Figure 3A:
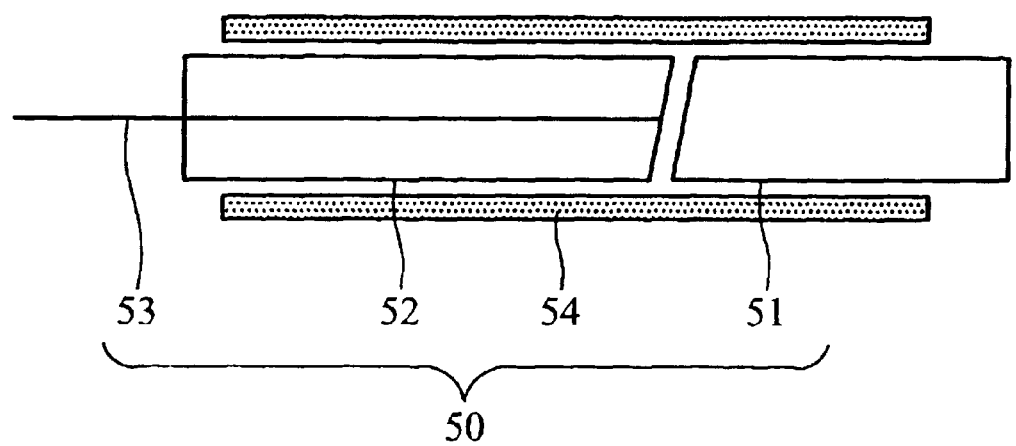
FIG. 3A is a schematic perspective view showing an optical collimator.

Referring to FIG. 3A, the optical collimator 50 includes at least a GRIN lens 51 and a glass ferrule 52. An optical fiber 53 is disposed in the glass ferrule 52. The optical collimator 50 further includes a glass tube 54 to fix the GRIN lens 51 and the glass ferrule 52.

Figure 3B:
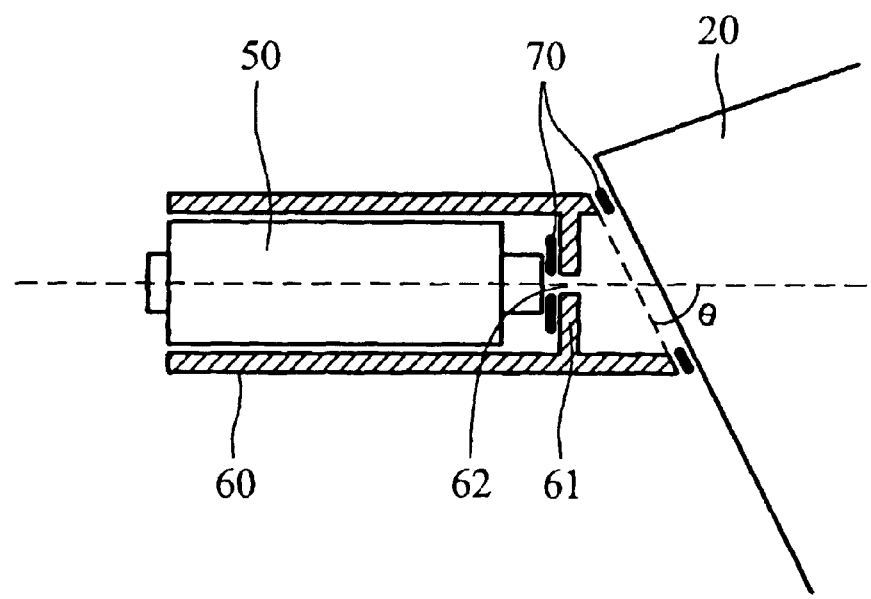
FIG. 3B is a schematic perspective view showing the input end of the zigzag wavelength division multiplexer of the invention.

Referring to FIG. 3B, the input end 30 has the optical collimator 50 and a first sleeve 60. A fixing portion 61 having a hole 62 is formed on the inner wall of the first sleeve 60. The optical collimator 50 is disposed in the first sleeve 60 and fixed to the fixing portion 61 by hot solidified resin. The axis of the first sleeve 60 is tilted to the plane of the opening of the first sleeve 60 at a predetermined angle θ. Preferably, the angle θ is between 75° and 90°.

Figure 4A:
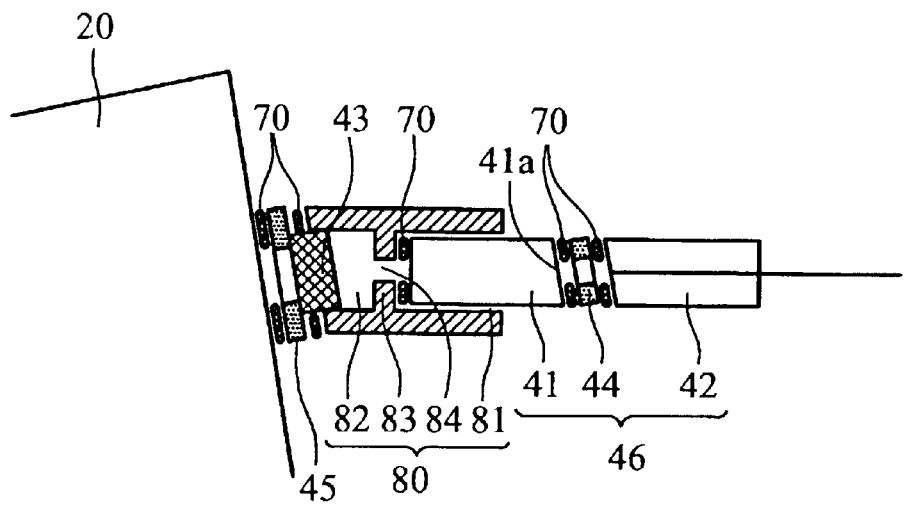
FIG. 4A is a schematic perspective view showing an output end of the zigzag wavelength division multiplexer of the invention.

Referring to FIG. 4A, the output end 40 has a GRIN lens 41, a glass ferrule 42, a wave filter 43, a first pad 44, a second pad 45 and a second sleeve 80. The second sleeve 80 has a first portion 81, a second portion 82 and a fixing portion 83. The fixing portion 83 has a hole 84 connected between the first portion 81 and the second portion 82. In the second sleeve 80, the axis of the first portion 81 is coaxial to that of the second portion 82. The axis of the second portion 82 is tilted to the plane of the opening of the second portion 82 at the predetermined angle θ. Preferably, the angle θ is between 75° and 90°. The wave filter 43 is disposed in the second portion 82 and fixed to the second pad 45 by hot solidified resin 70, and the opening of the second portion 82 is fixed to the second pad 45 by hot solidified resin 70. The GRIN lens 41 is disposed in the first portion 81 and fixed to the fixing portion 83 by hot solidified resin 70. The first pad 44 is fixed to an end 41*a* of the GRIN lens 41 by hot solidified resin 70. The glass ferrule 42 is fixed to the first pad 44 by hot solidified resin 70.

As described above, an optical collimator 46 having the first pad 44 is disposed in the first portion 81 and fixed to the fixing portion 83 of the second sleeve 80 by hot solidified resin 70. The second sleeve 80 and the wave filter 43 are fixed to the second pad 45 by hot solidified resin 70. Thus, the output end of the present zigzag wavelength division multiplexer is constructed. As shown in FIG. 4A, the output end of the present zigzag wavelength division multiplexer is disposed on one side of the intermediate block 20 by hot solidified resin 70.

Figure 4B:
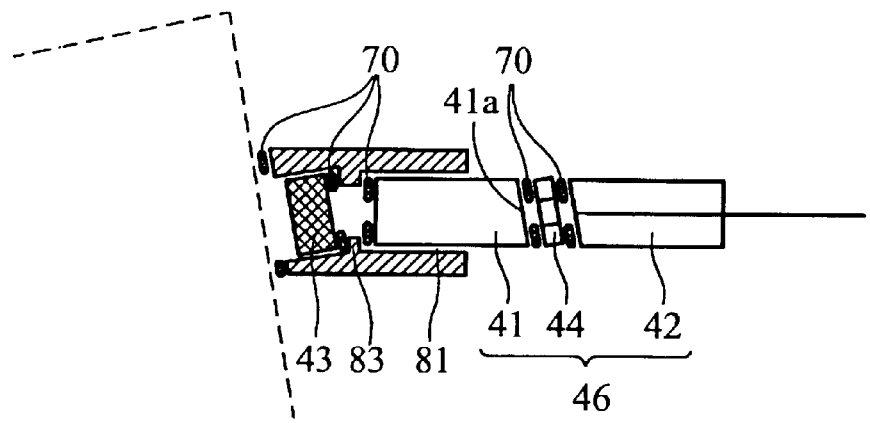
FIG. 4B is a schematic perspective view showing another output end of the zigzag wavelength division multiplexer of the invention.
Figure 4C:
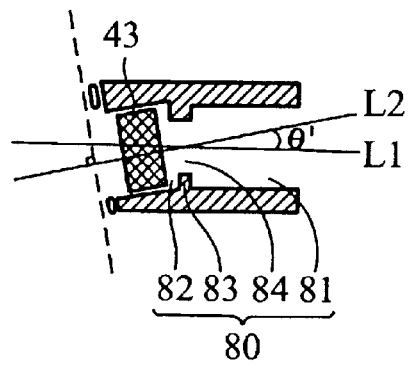
FIG. 4C is a schematic enlarged view showing the second sleeve according to FIG. 4B.

Referring to FIG. 4B and FIG. 4C, another output end of the present zigzag wavelength division multiplexer includes a GRIN lens 41, a glass ferrule 42, a wave filter 43, a first pad 44 and a second sleeve 80. The second sleeve 80 has a first portion 81, a second portion 82 and a fixing portion 83. The fixing portion 83 has a hole 84 connected between the first portion 81 and the second portion 82. In the second sleeve 80, the axis L1 of the first portion 81 is tilted to the axis L2 of the second portion 82 at a predetermined angle θ'. The axis L2 of the second portion 82 is perpendicular to the plane of the opening of the second portion 82. As shown in FIG. 4B, the wave filter 43 is disposed in the second portion 82 and fixed to the fixing portion 83 by hot solidified resin 70. Because of the predetermined angle θ' between the axis L1 of the first portion 81 and the axis L2 of the second portion 82, the wave filter 43 is substantially parallel to the side of the intermediate block 20. The GRIN lens 41 is disposed in the first portion 81 and fixed to the fixing portion 83 by hot solidified resin 70. The first pad 44 is fixed to an end 41*a* of the GRIN lens 41 by hot solidified resin 70. The glass ferrule 42 is fixed to the first pad 44 by hot solidified resin 70. Thus, the glass ferrule 42, the first pad 44 and the GRIN lens 41 construct the optical collimator 46 having the pad.

As described above, an optical collimator 46 having the first pad 44 is disposed in the first portion 81 and fixed to the fixing portion 83 of the second sleeve 80 by hot solidified resin 70. In addition, the optical collimator 46 having the first pad 44, the second sleeve 80 and the wave filter 43 construct the other output end of the present zigzag wavelength division multiplexer. As shown in FIG. 4B, the other output end of the present zigzag wavelength division multiplexer is fixed to the intermediate block 20 by hot solidified resin 70.

Figure 5:
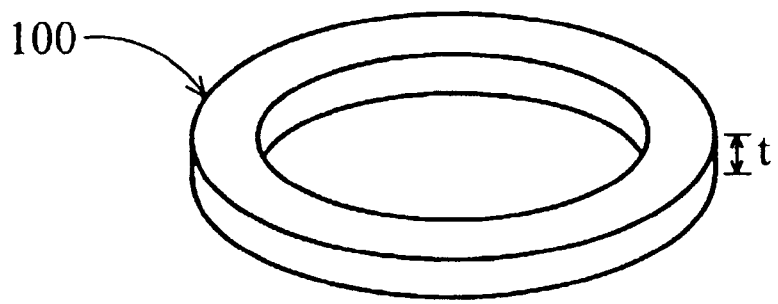
FIG. 5 shows the pad of the zigzag wavelength division multiplexer of the invention.

FIG. 5 shows the pad of the zigzag wavelength division multiplexer of the invention. As shown in FIG. 4A, FIG. 4B and FIG. 5, there is no effect on light penetration when the thickness t of the pad 45 is changed. On the other hand, light penetration is affected when the thickness t of the pad 44 is changed.

Figure 6:
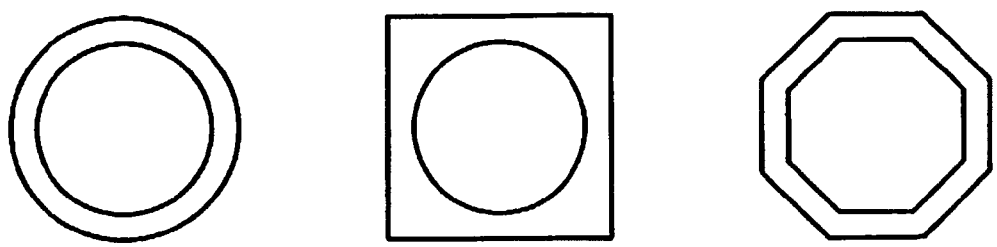
FIG. 6 is a schematic view showing the configurations of the pad.

FIG. 6 is a schematic view showing the configurations of the pad. The pad is hollow and has circular, rectangular and polygonal configurations. Additionally, the pad is made of metal, glass or other materials not deformed at temperatures over 200° C.

The intermediate block is made of a transparent material such as glass or quartz. Additionally, the intermediate block can be a hollow metal block.

In addition, the length of the first sleeve of the input end is substantially equal to that of the optical collimator. Furthermore, the depth of the first portion of the second sleeve of the output end is smaller than or equal to the length of the GRIN lens.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zigzag wavelength division multiplexer, comprising:
an intermediate block;
an input end disposed on one side of the intermediate block and having a first sleeve and an optical collimator, the first sleeve having a first fixing portion having a hole, the axis of the first sleeve tilted to the plane of the opening of the first sleeve at a first angle, the optical collimator disposed in the first sleeve and fixed to the first fixing portion; and
a plurality of output ends disposed on two sides of the intermediate block, each of the output ends having a second sleeve, a GRIN lens, a first pad, a glass ferrule, a second pad and a wave filter, the second sleeve having a first portion, a second portion and a second fixing portion having a hole, the axis of the first portion coaxial to that of the second portion, the axis of the second portion tilted to the plane of the opening of the second portion at a second angle, the GRIN lens disposed in the first portion and fixed to the second fixing portion, the first pad disposed on one end of the GRIN lens, the glass ferrule disposed on the first pad, the second pad disposed on the opening of the second portion of the second sleeve and the side of the intermediate block, the wave filter disposed in the second portion and on the second pad, wherein, after multi-channel light enters the intermediate block via the input end, the plurality of output ends output corresponding channel light, respectively.

2. The zigzag wavelength division multiplexer as claimed in claim 1, wherein the first sleeve is longer than the optical collimator.

3. The zigzag wavelength division multiplexer as claimed in claim 1, wherein the optical collimator is fixed to the first fixing portion and the first sleeve is fixed to the side of the intermediate block, both by hot solidified resin.

4. The zigzag wavelength division multiplexer as claimed in claim 1, wherein the first portion of the second sleeve is not longer than the GRIN lens.

5. The zigzag wavelength division multiplexer as claimed in claim 1, wherein the second sleeve is fixed to the second pad, the wave filter is fixed to the second pad, the GRIN lens is fixed to the second fixing portion, the first pad is fixed to the GRIN lens, the glass ferrule is fixed to the first pad, and the second pad is fixed to the side of the intermediate block, all by hot solidified resin.

6. The zigzag wavelength division multiplexer as claimed in claim 1, wherein the first pad and the second pad have circular, rectangular and polygonal configurations.

7. A zigzag wavelength division multiplexer, comprising:

an intermediate block;

an input end disposed on one side of the intermediate block and having a first sleeve and an optical collimator, the first sleeve having a first fixing portion having a hole, the axis of the first sleeve tilted to the plane of the opening of the first sleeve at a first angle, the optical collimator disposed in the first sleeve and fixed to the first fixing portion; and a plurality of output ends disposed on two sides of the intermediate block, each of the output ends having a second sleeve, a GRIN lens, a first pad, a glass ferrule and a wave filter, the second sleeve having a first portion, a second portion and a second fixing portion having an opening, the axis of the first portion tilted to that of the second portion at a second angle, the axis of the second portion substantially perpendicular to the plane of the opening of the second portion, the opening of the second portion disposed on the side of the intermediate block, the GRIN lens disposed in the first portion and fixed to the second fixing portion, the first pad disposed on one end of the GRIN lens, the glass ferrule disposed on the first pad, the wave filter disposed in the second portion and on the second fixing portion to parallel the side of the intermediate block, wherein, after multi-channel light enters the intermediate block via the input end, the plurality of output ends output corresponding channel light, respectively.

8. The zigzag wavelength division multiplexer as claimed in claim 7, wherein the first sleeve is longer than the optical collimator.

9. The zigzag wavelength division multiplexer as claimed in claim 7, wherein the optical collimator is fixed to the first fixing portion and the first sleeve is fixed to the side of the intermediate block, both by hot solidified resin.

10. The zigzag wavelength division multiplexer as claimed in claim 7, wherein the first portion of the second sleeve is not longer than the GRIN lens.

11. The zigzag wavelength division multiplexer as claimed in claim 7, wherein the opening of the second portion is fixed to the side of the intermediate block, the wave filter is fixed to the second fixing portion, the GRIN lens is fixed to the second fixing portion, the first pad is fixed to the GRIN lens, and the glass ferrule is fixed to the first pad, all by hot solidified resin.

12. The zigzag wavelength division multiplexer as claimed in claim 7, wherein the first pad has circular, rectangular and polygonal configurations.

* * * * *